(12) United States Patent
Yao et al.

(10) Patent No.: US 7,844,170 B2
(45) Date of Patent: Nov. 30, 2010

(54) METHOD FOR CONTROLLING FAN SPEED

(75) Inventors: Zhi-Jiang Yao, Shenzhen (CN); Ning-Yu Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-cheng, Taipei Hsien (TW)

( * ) Notice: Subject to any disclaimer, the term of this patent is extended or adjusted under 35 U.S.C. 154(b) by 277 days.

(21) Appl. No.: 12/205,142

(22) Filed: Sep. 5, 2008

(65) Prior Publication Data

US 2009/0261769 A1    Oct. 22, 2009

(30) Foreign Application Priority Data

Apr. 22, 2008    (CN) .................... 2008 1 0301254

(51) Int. Cl.
*H02P 25/28* (2006.01)
(52) U.S. Cl. .................... 388/804; 318/463; 318/472

(58) Field of Classification Search .................. 318/463, 318/472, 783, 779, 771; 388/804, 934; 361/23
See application file for complete search history.

(56) References Cited

U.S. PATENT DOCUMENTS

2008/0137240 A1*    6/2008    Yu et al. .................... 361/23

* cited by examiner

*Primary Examiner*—Karen Masih
(74) *Attorney, Agent, or Firm*—Clifford O. Chi

(57) ABSTRACT

A method for controlling a fan speed is disclosed. The fan cools a CPU in a computer. The method includes defining a CPU-max-temp value of a CPU, such that the first fan speed is linearly enhanced with the increase of a real temperature value of the CPU, when the real temperature value of the CPU is lower than the CPU-max-temp value, and changing the CPU-max-temp value to a higher CPU-max-temp value in a basic input output system. A second fan speed is linearly enhanced with an increase of the real temperature value, when the real temperature value is lower than the higher CPU-max-temp value. The second fan speed is less than the first fan speed at the real temperature value.

10 Claims, 4 Drawing Sheets

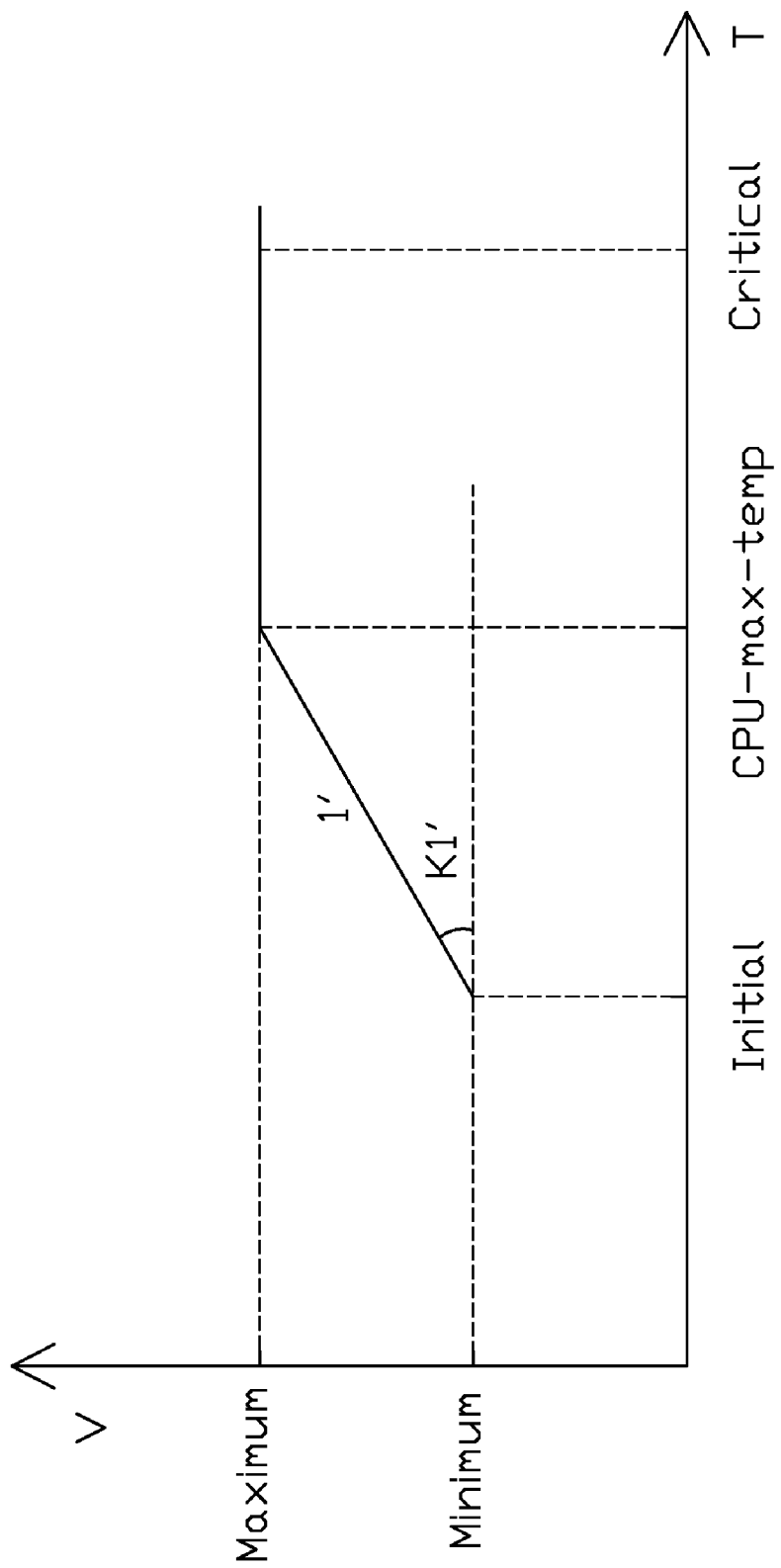
FIG. 4 <RELATED ART>

METHOD FOR CONTROLLING FAN SPEED

BACKGROUND

1. Technical Field

The present invention relates to a method for controlling a fan speed and, more particularly, to a method for controlling the fan speed in a computer.

2. Description of Related Art

As computer processing speeds steadily increase, the need for high capacity cooling systems becomes essential. Proper cooling prevents heat related failure of the processor under operating loads. Typical cooling systems have progressed beyond a constant running fan to include temperature sensors and related control circuits for dynamically adjusting fan speed. While several fan speed control schemes have been developed, nearly all focus entirely on maximizing cooling effects or reducing power consumption. However, fan noise level has been continuously neglected in the development of control schemes and related circuitry.

Referring to FIG. 4, a temperature value is proportional to a fan speed of a central processing unit in a computer system. When the temperature value is an initial temperature value, the fan works at a minimum speed. When the temperature value is at a CPU-max-temp value, the fan works at a maximum speed. However, the CPU-max-temp value is not shown beyond a critical temperature value defined by CPU manufacturers, because the CPU can be damaged beyond the critical temperature value. A fan monitor linear line 1' is shown in FIG. 4. A slope of the line 1' is K1'. Generally, the CPU-max-temp value is 10° C. which is a low temperature value. Thus, the fan works at the maximum speed when the CPU-max-temp value is only 10° C. The fan works at the maximum speed so that the fan makes much noise. It is expected that the fan does not work at the maximum speed when the CPU-max-temp value is only 10 degrees C. So the fan makes less noise.

What is needed, therefore, is a method for controlling a fan speed to overcome the above-described shortcomings.

BRIEF DESCRIPTION OF THE DRAWINGS

FIG. 4 is a graph of CPU temperature versus fan speed in a typical computer system.

DETAILED DESCRIPTION OF THE EMBODIMENTS

Figure 1:
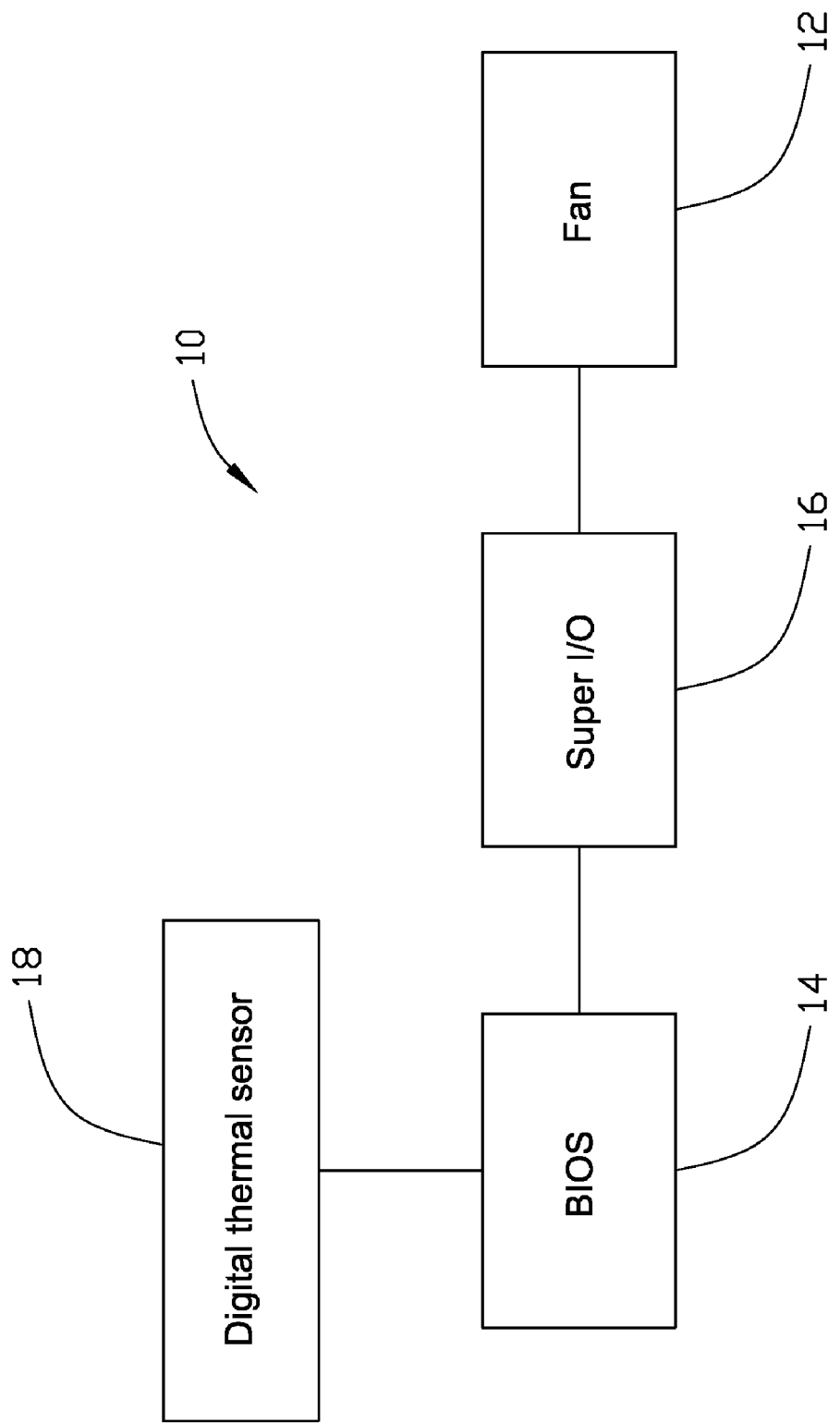
FIG. 1 is a block diagram of a fan speed control circuit

FIG. 1 illustrates a fan speed control circuit 10. The circuit 10 includes a fan 12 connected to a basic input output system (BIOS) 14 through a super input-output interface (Super I/O) 16, and a digital thermal sensor 18 connected to the BIOS 14. The BIOS 14 is pre-configured with a linear relationship between measured CPU temperatures and fan speeds, and generates and outputs a control signal corresponding to the fan speed based on the measured CPU temperature. When the measured temperature is received from the digital thermal sensor 18, the BIOS 14 outputs the control signal to the Super I/O 16 which controls the rotational speed of the fan 12.

Figure 2:
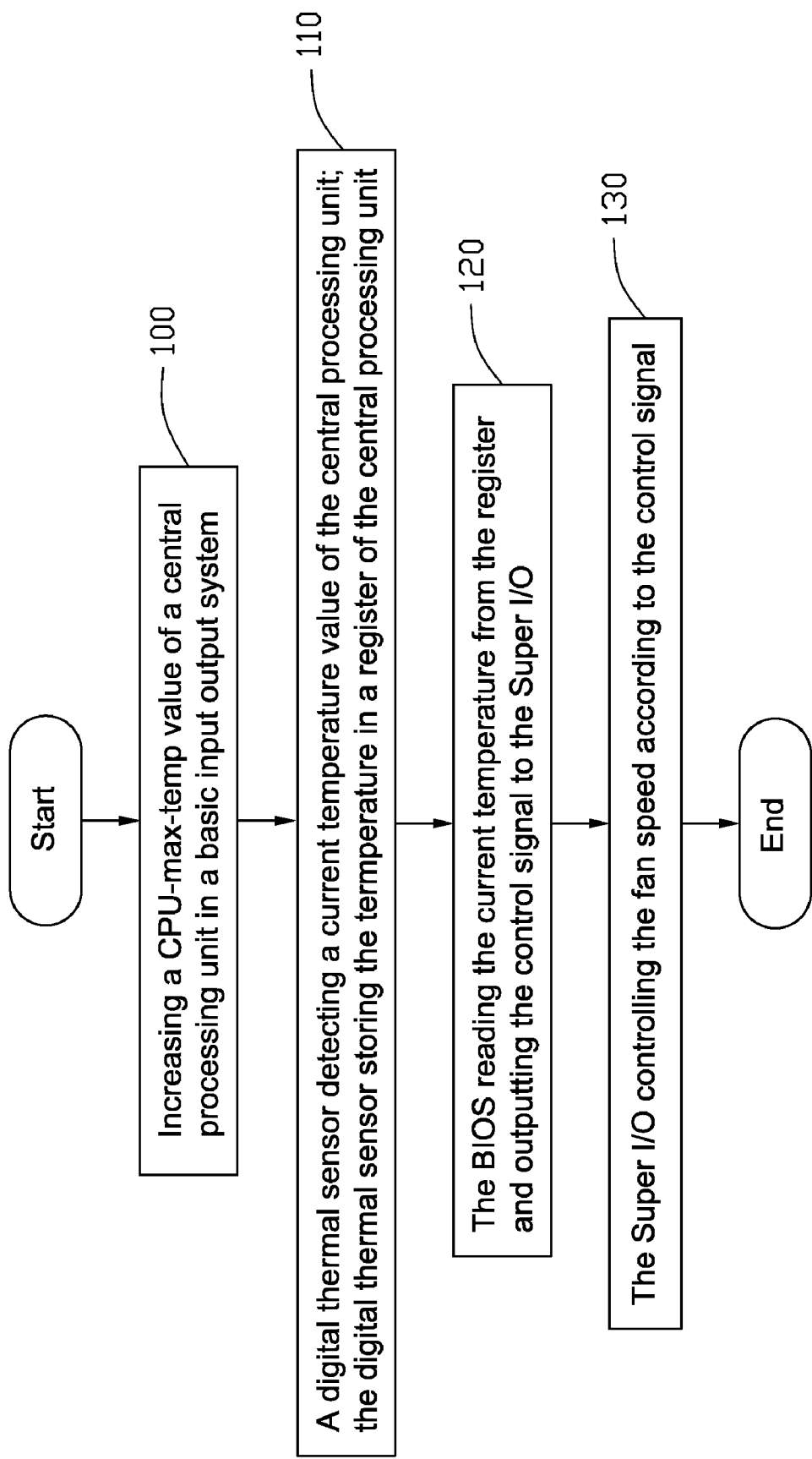
FIG. 2 is a flow chart illustrates an embodiment of a method for controlling a fan speed.

FIG. 2 illustrates an embodiment of a method for controlling a fan speed. Depending on the embodiment, certain of the steps described below may be removed, others may be added, and the sequence may be altered. The method includes the following steps:

Step 100: increasing a CPU-max-temp value of a central processing unit in the BIOS 14 to a higher CPU-max-temp value; the higher CPU-max-temp value being lower than the critical temperature value of the CPU indicated by the CPU manufacturers.

Step 110: a digital thermal sensor 18 detecting a current temperature value of the central processing unit; the digital thermal sensor storing the current temperature as a measured temperature in a register of the central processing unit.

Step 120: the BIOS 14 reading the measured temperature of the central processing unit from the register and outputting the control signal to the Super I/O 16;

Step 130: the Super I/O 16 controlling the fan speed of the central processing unit according to the control signal.

Figure 3:
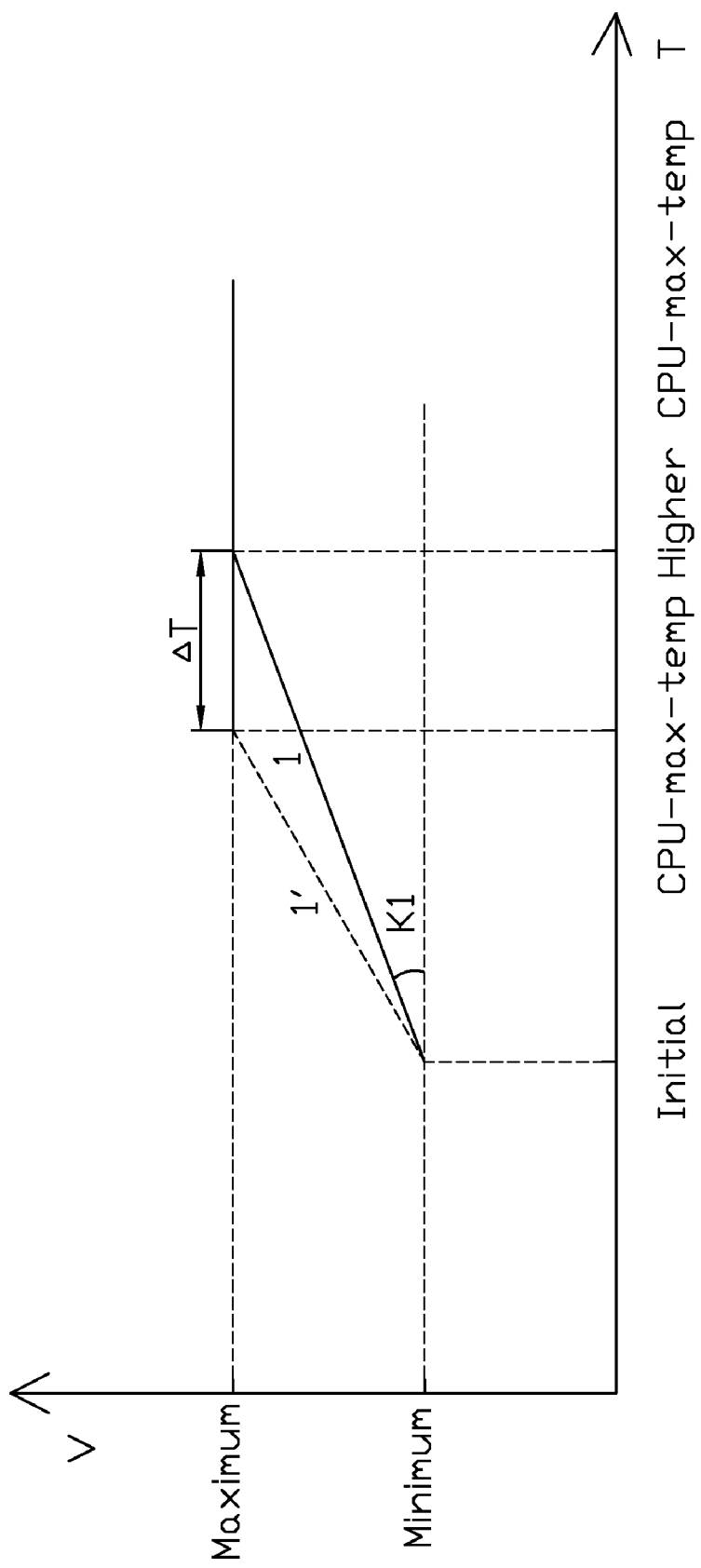
FIG. 3 is a graph of CPU temperature versus fan speed in accordance with the embodiment.

FIG. 3 is a graph of CPU temperature versus fan speed in accordance with the embodiment of the fan speed control circuit. In contrast to FIG. 4, the CPU-max-temp value is increased to the higher CPU-max-temp value. A CPU temperature to fan speed graph plotting linear line 1 is shown in FIG. 3. The slope of the line 1 is K1. The slope K1 is less than K1'. Thus, when the current temperature value of the central processing unit is at the higher CPU-max-temp value, the fan speed has reached a maximum fan speed. When the current temperature value of the central processing unit is at the CPU-max-temp value, a fan speed is lower than the maximum fan speed. When the fan speed is a lower fan speed, the fan makes less noise. In addition, the higher CPU-max-temp value is smaller than the critical temperature value of the CPU indicated by the CPU manufacturers. In addition, if the real temperature value of the central processing unit goes above the higher CPU-max-temp value, the fan is automatically run at the maximum speed.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for controlling a speed of a fan cooling a central processing unit (CPU) in a computer, the method comprising:

defining a CPU-max-temp value of a central processing unit, wherein a first fan speed is linearly enhanced with an increase of a real temperature value of the CPU, when the real temperature value is lower than the CPU-max-temp value; and changing the CPU-max-temp value to reach a higher CPU-max-temp value of the CPU in a basic input output system (BIOS), wherein a second fan speed is linearly enhanced with an increase of the real temperature value, when the real temperature value is lower than the higher CPU-max-temp value; the second fan speed is smaller than the first fan speed at the real temperature value.

2. The method of claim 1, wherein the higher CPU-max-temp value is smaller than a critical temperature value indicated by CPU manufacturers.

3. The method of claim 1, wherein a digital thermal sensor detects a current temperature value of the central processing unit and stores the current temperature in a register of the central processing unit.

4. The method of claim 3, wherein the BIOS reads the current temperature from the register and outputs a control signal to the super input-output interface (Super I/O) to control the fan speed according to the control signal.

5. A method for controlling a speed of a fan cooling a central processing unit (CPU) in a computer, the method comprising:

increasing a CPU-max-temp value of a central processing unit corresponding to a maximum speed of the fan in a basic input output system (BIOS) as a higher CPU-max-temp value, wherein the fan is working at the maximum speed when a real temperature value of the central processing unit exceeds the higher CPU-max-temp value;

detecting the real temperature value of the central processing unit and storing the temperature in a register of the central processing unit;

reading the real temperature from the register; and controlling the fan speed according to a control signal the BIOS outputs to the Super I/O.

6. The method of claim 5, wherein the higher CPU-max-temp value is less than a critical temperature value indicated by CPU manufacturers.

7. The method of claim 5, wherein the fan rotational speed is a minimum speed, when the real temperature of the central processing unit is an initial temperature value.

8. The method of claim 5, wherein a first fan speed is linearly enhanced with an increase of the real temperature value, when the real temperature value is lower than the CPU-max-temp value.

9. The method of claim 8, wherein a second fan speed is linearly enhanced with an increase of the real temperature value, when the real temperature value of the central processing unit is lower than the higher CPU-max-temp value.

10. The method of claim 9, wherein the second fan speed is less than the first fan speed at the real temperature value.

* * * * *